United States Patent [19]

Eidinger

[11] 3,935,509

[45] Jan. 27, 1976

[54] SYNCHRONIZED SWITCH WITH PARALLEL CONTACT

[75] Inventor: Adolf Eidinger, Nussbaumen, Switzerland

[73] Assignee: BBC Brown Boveri & Company Limited, Baden, Switzerland

[22] Filed: May 17, 1974

[21] Appl. No.: 470,990

[30] Foreign Application Priority Data

May 21, 1973 Switzerland ........................ 7120/73

[52] U.S. Cl. .............. 317/11 A; 307/136; 317/11 C

[51] Int. Cl.[2] ............................................ H02H 7/22

[58] Field of Search .......... 317/11 A, 11 C; 307/136

[56] References Cited

UNITED STATES PATENTS 2,849,659 8/1958 Kesselring ........................ 317/11 A

*Primary Examiner*—James D. Trammell

*Attorney, Agent, or Firm*—Pierce, Scheffler & Parker

[57] ABSTRACT

A switching arrangement located in the vicinity of and connected to an alternating current generator for disconnecting the generator under load and particularly under short-circuit current conditions includes a first switch connected to the generator and whose contacts are designed for carrying normal load current therefrom in a continuous manner. A second switch of the synchronized type whose contacts operate at high speed and are made comparatively less massive than those of the first switch is connected in parallel with the latter and is arranged to open its contacts subsequent to an opening operation of the contacts of the first switch. An ohmic resistor is connected in the current flow path through the second switch and its resistance is at most a 0.2 fold and preferably a 0.1 fold value of the sub-transient short-circuit impedance of the generator in order to facilitate the final switching out at the contacts of the second switch.

1 Claim, 4 Drawing Figures

SYNCHRONIZED SWITCH WITH PARALLEL CONTACT

The present invention relates to a synchronous switch located in the vicinity of an electrical generator for switching the output of the generator and which is provided with a parallel contact.

Electrical switches of the type referred to above are required to handle very large currents up to as much as 250 kiloamperes when switching off the power. Because such heavy short-circuit currents are very hazardous and may cause severe damage to equipment, very brief cut-off times are essential. Since in the case of short-circuits in the vicinity of the generator, the alternating current component of the short-circuit current will decay much more rapidly than the direct current component, a zero current passage interval, essential for current interruption, will not occur for a relatively long period of time, a period which in the case of generators having a high power output could amount to as much as several hundreds of milli-seconds. The decay in the direct current component is controlled by the time constant $T_a$ of the short-circuit loop according to the equation $$T_a = L/R$$

wherein:

$L$ represents the inductance of the generator and $R$ is the ohmic resistance of the short-circuit loop In the case of alternating current switches, the time constant of the short-circuit loop is shortened substantially, e.g. by a factor of 10, due to the additional resistance of the circuit-breaking arc, and the first zero current passage interval will occur not later than 25 milli-seconds following contact separation. At this moment quenching by the switch can be made to occur.

Alternating current switches, however, have a serious disadvantage in that contact erosion will be substantial because of the strong arcing, thus making it necessary to design the contact pieces in such manner that they will be very heavy and massive. On the other hand, contact construction of synchronized switches which are subjected to like breaking currents can be made relatively lighter because there the arc, generated at cut-off, will burn only for one milli-second at the most so that the contact erosion effect will be much lower. However, since the contacts of synchronized switches are kept very light because of the high speed at which they must operate, not enough mass is present to enable them to carry the normal current on a continuous basis and hence such switches are provided with an auxiliary switch connected in parallel therewith. Upon cut-off, in the event of a short circuit, the contacts of the auxiliary parallel-connected switch open first thus commutating the current to the contacts of the synchronized switch and these contacts then open at the next current zero passage interval and break the short-circuit current.

However, since there is almost no arcing connected with the operation of contacts of switches of the synchronized type such switches are unable to influence the direct current component and to force the current zero by a reduction in the time constant of the short-circuit loop. Therefore, the disconnection cannot be accomplished until the first natural current zero interval occurs.

The object of the present invention is to provide an improved switching arrangement for use in conjunction with nearby generators which is based upon the synchronization principle and which is able to extinguish even slowly decreasing short-circuit currents within a brief period of time. This objective is accomplished in such manner that within the flow path of the current passing through the contacts of the synchronized switch there is placed an ohmic resistance which possesses at most a 0.2 fold and preferably a 0.1 fold value of the subtransient short-circuit impedance of the generator.

The generator switch proposed by the invention is particularly advantageous in comparison with known arrangements because it combines the advantageous contact structure of a synchronized switch, i.e. arc-less and therefore small-sized, with the short cut-off time of the alternating current switch.

The invention will be further explained in conjunction with the accompanying drawings wherein.

Figure 1:
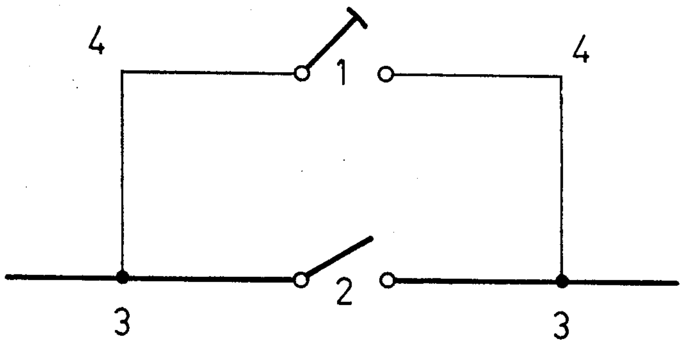
FIG. 1 is a schematic representation of a generator switch with paralleled current flow paths operating in accordance with the synchronization principle typifying the present state of the art.

In FIG. 1, numeral 1 represents the contacts of a synchronized switch, 2 represents the contacts of the auxiliary, load-carrying switch connected in parallel therewith, 3—3 depict the current flow path through the contacts of the load switch 2 which handles the normal current flow from the nearby generator, not illustrated, this path being shown by a heavy line, and 4—4 depict by a lighter line the flow path through the paralleled contacts of the synchronized switch 1 of the current commuted to it upon opening of the contacts of switch 2. As previously explained, upon power cut-off, switch 2 will open first thereby commutating current to the flow path through the contacts of switch 1 which then open at high speed at the next zero current interval and break the short-circuit current.

Figure 2:
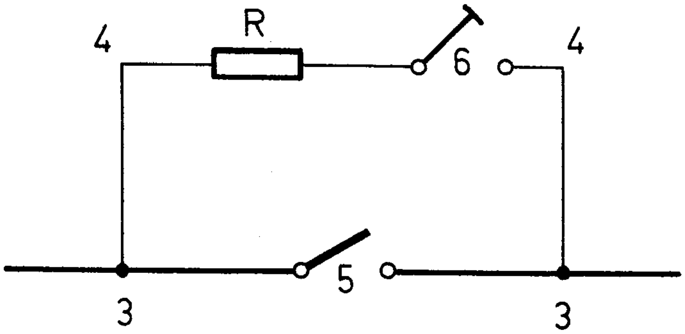
FIG. 2 is also a schematic representation of a generator switch with paralleled current flow paths wherein an ohmic resistance is introduced into one of the paths.

The known circuit breaker arrangement illustrated in FIG. 2 includes an ohmic resistor R placed in series with the current path 4—4 through the switching point 6 placed in parallel with the current path 3—3 containing the arc switch 5. This resistor must, on the one hand, be kept sufficiently small to permit, at the opening instant of the arc switch 5, the desired commutation of the current from the path 3—3 to the paralleled path 4—4 without difficulties, but must, on the other hand, also be sufficiently great in order to facilitate and promote current interruption at the switching point 6. Such circuitry affects the steepness and intensity of the recovery voltage and serves, in addition to facilitating the performance of the switching point 6, the task of establishing a uniform voltage distribution in the case of multi-chamber switches.

In order to attain the necessary aperiodic damping of the recovery voltage, it becomes necessary to make the value of resistor R substantially greater than the subtransient short-circuit impedance $\omega L$ of the generator.

Figure 3:
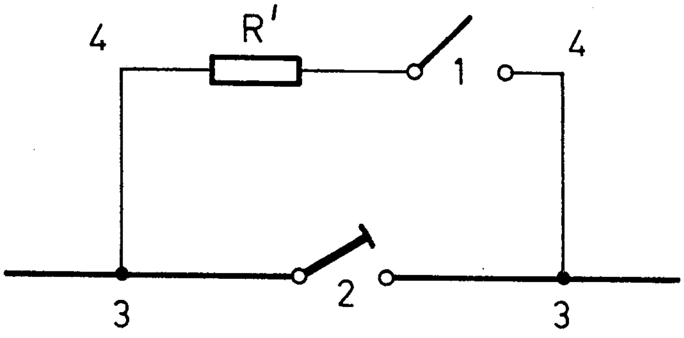
FIG. 3 is a schematic representation of a generator switch with paralleled current flow paths in accordance with the invention.

FIG. 3 illustrates the improved switching arrangement in accordance with the present invention which operates on an essentially different principle. The ohmic resistor R′ which is located in series with the synchronized switching device 1 in the current commutating path 4—4 paralleling current path 3—3 which contains the initial load breaking switch 2 possesses at most a 0.2 fold, and preferably a 0.1 fold value of the subtransient short-circuit reactance $\omega L$ of the generator. Accordingly, the voltage drop across resistor R′, even after opening of the power circuit breaker 2 and commutation of current to the paralleling flow path 4—4, will reach at the most a 0.2 fold value of the full working voltage U (FIG. 4) so that the task of commutation will not be impeded significantly by this additional resistor R′. Furthermore, the value of resistor R′ is so small that it will not reduce to any significant extent the short-circuit current I at commutation. The resistor R′ will reduce the time constant $T_a = L/R$ (equation 1 supra) of the circuit which previously offered almost no resistance to the direct current, to such a degree that after a few milli-seconds, and at the latest after 25 milli-seconds, a current-zero interval will occur at which time the contacts of the synchronized switch can then break the circuit.

Figure 4:
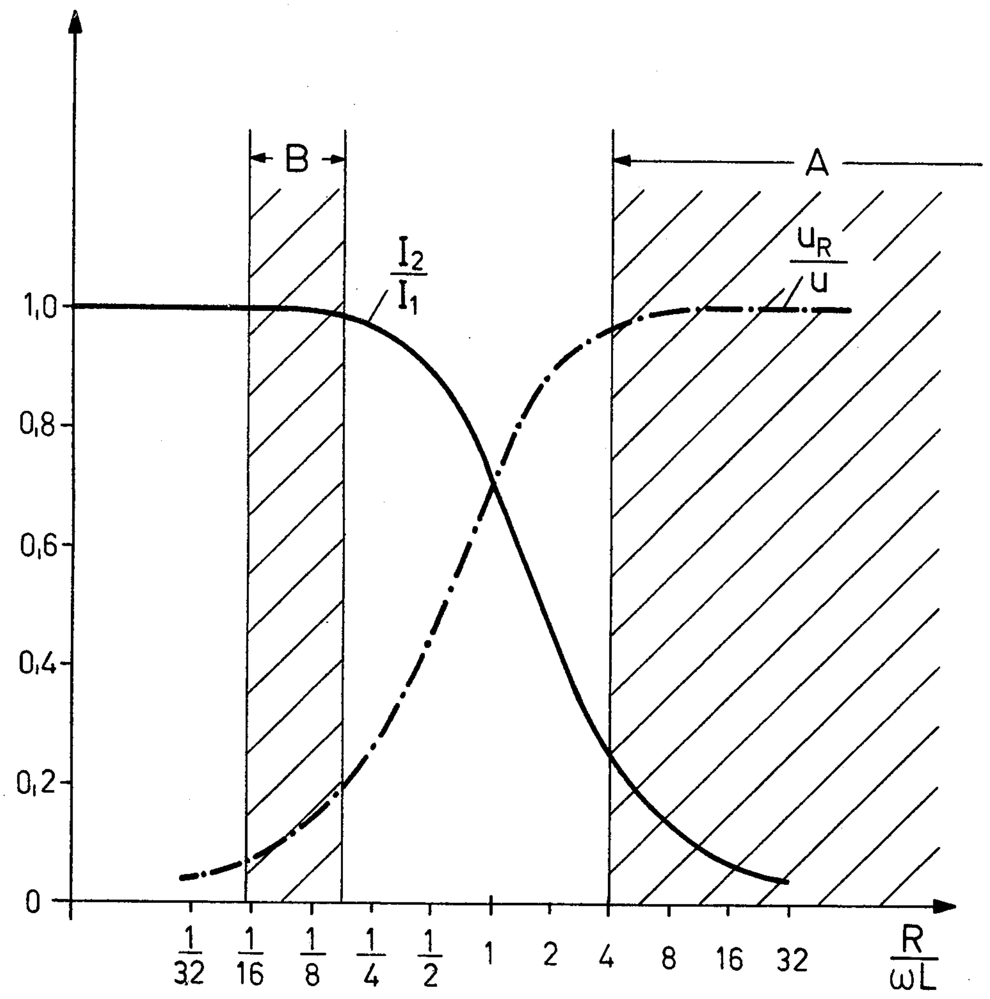
FIG. 4 depicts comparative performance graphs of the known type of switch according to FIG. 2 and a switch in accordance with the invention.

FIG. 4 illustrates in a graphic manner a characteristic A of a known generator switching arrangement, and also in comparison therewith a characteristic B of a switching arrangement in accordance with the present invention. The ratio $R/\omega L$ of the ohmic resistor R to the sub-transient short-circuit reactance $\omega L$ of the short-circuit loop is plotted along the abscissa against the ratio $I_2/I_1$ of resistor current $I_2$ to short-circuit current $I_1$, or respectively the ratio of voltage drop $U_R$ across resistor R to the full working voltage U.

Characteristic A shows that the resistor current $I_2$ is always substantially lower than the short-circuit current $I_1 : I_2 \leq 0.25\ I_1$ and the resistor is practically loaded by the full working voltage: $U_R \approx U$. There is essentially no commutation proper. Rather quenching of the current at a zero passage interval is facilitated by damping of the recovery voltage.

In the operating region B, $I_2 \approx I_1$ and the voltage $U_R$ across the resistor remains very low, i.e. $U_R$ ranges from 0.05 to 0.2 U.

I claim:

1. A switching arrangement located in the vicinity of and connected to an alternating current generator for disconnecting the generator under load comprising a first switch connected to the generator for carrying the normal load current therefrom in a continuous manner, a second switch of the synchronized type connected in parallel with said first switch and which is arranged to open its contacts in a zero current interval following an opening operation of the contacts of said first switch, and an ohmic resistor connected in the current flow path through said second switch and whose resistance is at most a 0.2 fold and preferably a 0.1 fold value of the sub-transient short-circuit impedance of said generator.

* * * * *